United States Patent
Byun

(10) Patent No.: US 11,249,903 B2
(45) Date of Patent: Feb. 15, 2022

(54) MEMORY SYSTEM FOR GARBAGE COLLECTION OPERATION AND OPERATING METHOD THEREOF

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 32 days.

(21) Appl. No.: 16/782,880

(22) Filed: Feb. 5, 2020

(65) Prior Publication Data
US 2020/0387447 A1 Dec. 10, 2020

(30) Foreign Application Priority Data
Jun. 10, 2019 (KR) .................. 10-2019-0067907

(51) Int. Cl.
G06F 12/02 (2006.01)
G06F 3/06 (2006.01)
G06N 5/04 (2006.01)

(52) U.S. Cl.
CPC .......... *G06F 12/0253* (2013.01); *G06F 3/064* (2013.01); *G06F 3/0608* (2013.01); *G06F 3/0659* (2013.01); *G06F 3/0679* (2013.01); *G06N 5/04* (2013.01); *G06F 2212/1044* (2013.01)

(58) Field of Classification Search
CPC .... G06F 12/0253; G06F 3/0679; G06F 3/064; G06F 3/0608; G06F 3/0659; G06F 2212/1044; G06N 5/04
See application file for complete search history.

(56) References Cited

U.S. PATENT DOCUMENTS

| | | | |
|---|---|---|---|
| 9,645,744 B2 | 5/2017 | Ellis et al. | |
| 9,652,415 B2 | 5/2017 | Ellis | |
| 2006/0184723 A1* | 8/2006 | Sinclair | G06F 3/0608 711/103 |
| 2011/0138100 A1* | 6/2011 | Sinclair | G06F 12/0246 711/5 |
| 2013/0042067 A1* | 2/2013 | Thomas | G06F 12/0207 711/120 |
| 2017/0123718 A1 | 5/2017 | Sinha et al. | |
| 2018/0137060 A1* | 5/2018 | Park | G06F 3/0679 |
| 2018/0275922 A1* | 9/2018 | Nemazie | G06F 12/1009 |
| 2018/0367460 A1* | 12/2018 | Gao | G06F 9/5083 |

FOREIGN PATENT DOCUMENTS

KR  10-2017-0052442  5/2017

\* cited by examiner

*Primary Examiner* — David Yi
*Assistant Examiner* — Trung-Hao Joseph Nguyen
(74) *Attorney, Agent, or Firm* — IP & T Group LLP

(57) ABSTRACT

A memory system may include a memory device including a plurality of dies each including a plurality of memory blocks; and a controller including a memory and a garbage collection module configured to perform a garbage collection operation by transmitting data to the memory device through at least one of a plurality of data paths, wherein the garbage collection module: determines whether the garbage collection operation is executable in parallel with a host task operation, depending on which of the plurality of dies includes a target block of the garbage collection operation.

28 Claims, 12 Drawing Sheets

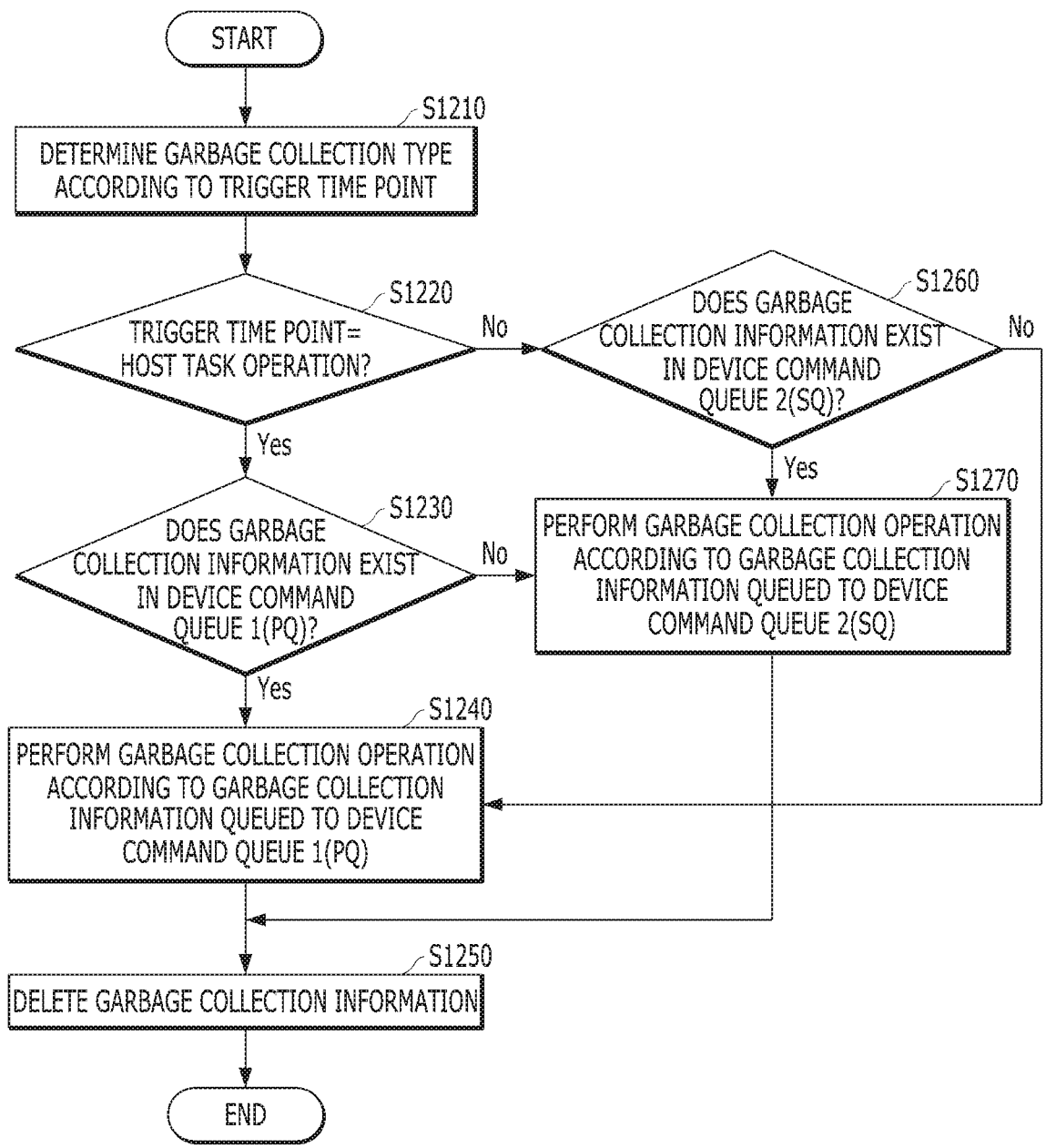

MEMORY SYSTEM FOR GARBAGE COLLECTION OPERATION AND OPERATING METHOD THEREOF

CROSS-REFERENCE TO RELATED APPLICATION

This application claims priority under 35 U.S.C. § 119 to Korean Patent Application No. 10-2019-0067907, filed on Jun. 10, 2019, which is incorporated herein by reference in its entirety.

BACKGROUND

1. Field

The present invention relates to a memory system with an improved garbage collection operation and method for performing such operation. More particularly, the present invention relates to an apparatus and method for transmitting map data to a host or computing device in a memory system included in a data processing system.

2. Discussion of the Related Art

Recently, the paradigm for the computer environment has shifted to ubiquitous computing, which allows computer systems to be used anytime and anywhere. As a result, the use of portable electronic devices such as mobile phones, digital cameras, and laptop computers has rapidly increased. In general, such portable electronic devices use a memory system including a memory device, that is, a data storage device. The data storage device is used as a main memory device or an auxiliary memory device of the portable electronic devices.

SUMMARY

Various embodiments are directed to provide a memory system capable of executing a host command and a device command in parallel or in series and an operating method thereof.

Also, various embodiments are directed to provide a memory system capable of selecting and performing a device task according to a trigger time point in primary and secondary command queues in which device commands are classified and stored according to whether a parallel operation is executable, and an operating method thereof.

Also, various embodiments are directed to provide a memory system capable of selectively performing a device task according to a trigger time point by separately controlling a primary command queue in which a device task executable in parallel with a host task is stored and a secondary command queue in which a device task executable alternately with a host task is stored, and an operating method thereof.

Also, various embodiments are directed to provide a memory system capable of reducing a time required for garbage collection by using a block of another area where a corresponding block (or an open block) is not located or reducing a bottleneck phenomenon in data movement between a memory device divided through a data communication line such as a channel and a way and a controller, in order to perform garbage collection on the corresponding block included in at least one of a plurality of areas in the memory device, and an operating method thereof.

In accordance with the memory control device and method according to various embodiments, it is possible to perform, in parallel or alternately, a host task of processing a command of a host by controlling the memory device and a device task of performing an operation of the memory device itself.

In accordance with the present technology, since a first device task for performing garbage collection in a die including no open block for performing a program operation and a second device task for performing garbage collection in a die including the open block are separately managed, the garbage collection operation and the program operation can be selectively performed in parallel or alternately according to garbage collection execution conditions, so that it is possible to substantially prevent performance degradation due to the garbage collection operation.

In the memory system in accordance with various embodiments, garbage collection information corresponding to a victim block is queued to separate queues according to status information, so that it is possible to efficiently use a memory space and quickly perform the garbage collection operation.

According to an embodiment, a memory system may include a memory device including a plurality of dies each including a plurality of memory blocks; and a controller including a memory and a garbage collection module configured to perform a garbage collection operation by transmitting data to the memory device through at least one of a plurality of data paths, wherein the garbage collection module: determines whether the garbage collection operation is executable in parallel with a host task operation, depending on which of the plurality of dies includes a target block of the garbage collection operation.

According to an embodiment, an operating method of a memory system comprising a memory device including a plurality of dies each including a plurality of memory blocks and a controller including a memory and configured to perform a host task operation and a garbage collection operation by transmitting data to the memory device through at least one of a plurality of data paths, the operating method may include determining whether the host task operation and the garbage collection operation are executable in parallel; detecting a victim block; storing garbage collection information and status information corresponding to the victim block in the memory, the garbage collection information including address information of the victim block and the status information indicating whether the garbage collection operation on the victim block is executable in parallel with the host task operation; sequentially queuing the garbage collection information to a parallel command queue or a serial command queue according to the status information; determining a garbage collection type according to a trigger time point; and performing the garbage collection operation in parallel according to the garbage collection information queued in the parallel or serial command queue corresponding to the garbage collection type.

According to an embodiment, a memory system may include a memory device including dies operably coupled to respective channels and each having memory blocks; and a controller configured to control, through the channels, the memory device to perform a device task operation; on a first victim block, of a die different from a die in which a target memory block of a host task operation resides, in parallel with the host task operation, and on a second victim block, of the same die as the target memory block, during an idle time of the same die.

According to an embodiment, an operating method of a controller for controlling, through channels, a memory device including dies operably coupled to the channels respectively and each having memory blocks may include controlling the memory device to perform a device task collection operation on a first victim block, of die different from a die in which a target memory block of a host task operation resides, in parallel with the host task operation; and controlling the memory device to perform a device task operation on a second victim block, of the same die as the target memory block, during an idle time of the same die.

BRIEF DESCRIPTION OF THE DRAWINGS

FIG. 12 is a flowchart illustrating an operation process of a garbage collection manager in accordance with an embodiment.

DETAILED DESCRIPTION

The following description focuses on features and aspects of various embodiments of the present invention. Well-known information may be omitted in order not to unnecessarily obscure subject matter of the present invention.

Various embodiments are described in more detail below with reference to the accompanying drawings. Throughout the specification, reference to "an embodiment," "another embodiment" or the like is not necessarily to only one embodiment, and different references to any such phrase are not necessarily to the same embodiment(s).

Figure 1:
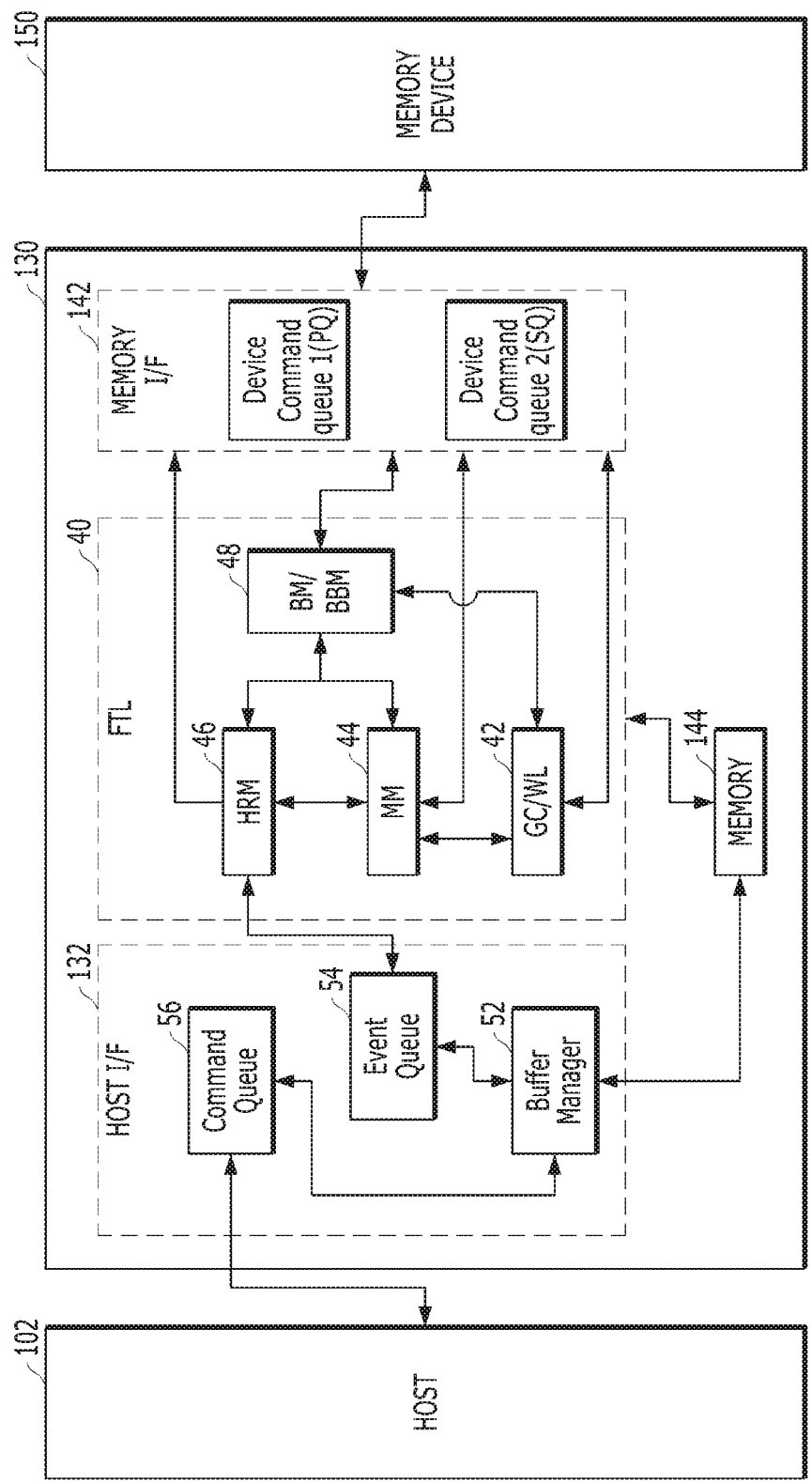
FIG. 1 shows a controller of a memory system in accordance with an embodiment of the disclosure.

FIG. 1 shows a controller 130 of a memory system 110 in accordance with an embodiment of the disclosure.

Referring to FIG. 1, the controller 130 is described in detail. The controller 130 cooperates with the host 102 and a memory device 150 of the memory system. The controller 130 includes a host interface (I/F) 132, a memory interface (I/F) 142, a memory 144 and a flash translation layer (FTL) 140.

The host interface 132 may handle commands, data, and the like received from the host 102. By way of example but not limitation, the host interface 132 may include a buffer manager 52, an event queue 54 and a command queue 56. The command queue 56 may sequentially store commands, data, and the like received from the host 102 and output them to the buffer manager 52 in the order in which they are stored. The buffer manager 52 may classify, manage or adjust the commands, the data, and the like, which are delivered from the command queue 56. The event queue 54 may sequentially transmit events for processing the commands, the data, and the like received from the buffer manager 52.

A plurality of commands and/or data of the same characteristic may be continuously received from the host 102. Alternatively, a plurality of commands and/or data of different characteristics may be received from the host 102, after being mixed or jumbled. For example, the host 102 may transmit a plurality of commands for reading data (i.e., read commands). For another example, the host 102 may alternatively transmit commands for reading data (i.e., read command) and programming/writing data (i.e., write command). The host interface 132 may store commands, data, and the like, which are received from the host 102, to the command queue 56 sequentially. Thereafter, the host interface 132 may estimate or predict what kind of operation the controller 130 will perform according to the characteristics of the command, data, and other relevant information which is received from the host 102. The host interface 132 may determine a processing order and a priority of commands and data, based at least on their characteristics. According to characteristics of commands and data, the buffer manager 52 of the host interface 132 is configured to determine whether the buffer manager 52 should store commands and data in the memory 144, or whether the buffer manager 52 should deliver the commands and the data to the FTL 140. The event queue 54 receives events from the buffer manager 52, which are to be internally executed and processed by the memory system 110 (e.g., the controller 130) in response to the commands and the data, so as to deliver the events to the FTL 140 in the order received.

In accordance with an embodiment, the FTL 140 may include a state manager (GC/WL) 42, a map manager (MM) 44, a host request manager (HRM) 46, and a block manager (BM or BBM) 48. The host request manager 46 may manage the events entered from the event queue 54. The map manager 44 may handle or control map data. The state manager 42 may perform garbage collection (GC) or wear leveling (WL). The block manager 48 may execute commands or instructions on a block in the memory device 150.

By way of example but not limitation, the host request manager 46 may use the map manager 44 and the block manager 48 to handle or process requests according to the read and program commands, and events which are delivered from the host interface 132. The host request manager 46 may send an inquiry request to the map manager 44, to determine a physical address corresponding to the logical address which is entered with the events. The host request manager 46 may send a read request with the physical address to the memory interface 142, to process the read request (or handle the events). On the other hand, the host request manager 46 may send a program request (or write request) to the block manager 48, to program entered data to a specific page of the unrecorded (no data) in the memory device 150. Then, the host request manager 46 may transmit a map update request corresponding to the program request to the map manager 44, to update an item relevant to the program med data in information of mapping the logical-to-physical addresses to each other.

The block manager 48 may convert a program request delivered from the host request manager 46, the map manager 44, and/or the state manager 42 into a flash program request used for the memory device 150, to manage flash blocks in the memory device 150. In order to maximize or enhance program or write performance of the memory system 110, the block manager 48 may collect program requests and send flash program requests for multiple-plane and one-shot program operations to the memory interface 142. The block manager 48 may send several flash program requests to the memory interface 142 to enhance or maximize parallel processing of the multi-channel and multi-directional flash controller (i.e., the memory interface 142).

The block manager 48 may be configured to manage blocks in the memory device 150 according to the number of valid pages. Further, the block manager 48 may select and erase blocks having no valid pages when a free block is needed, and select a block including the least valid page when it is determined that garbage collection is necessary. The state manager 42 may perform garbage collection to move the valid data to an empty block and erase the blocks containing the moved valid data so that the block manager 48 may have enough free blocks (i.e., empty blocks with no data). If the block manager 48 provides information regarding a block to be erased to the state manager 42, the state manager 42 may check all flash pages of the block to be erased to determine whether each page is valid. For example, to determine validity of each page, the state manager 42 may identify a logical address stored in an area (e.g., an out-of-band (OOB) area) of each page. To determine whether each page is valid, the state manager 42 may compare the physical address of the page with the physical address mapped to the logical address obtained from the inquiry request. The state manager 42 sends a program request to the block manager 48 for each valid page. A mapping table may be updated through the update of the map manager 44 when the program operation is completed.

The map manager 44 may manage a logical-to-physical mapping table. The map manager 44 may process requests such as queries, updates, and the like, which are generated by the host request manager 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request may be sent to the block manager 48 so that a clean cache block is made, and the dirty map table may be stored in the memory device 150.

When garbage collection is performed, the state manager 42 copies valid page(s) into a free block, and the host request manager 46 may program the latest version of the data for the same logical address of the page and currently issue an update request. When the state manager 42 requests the map update in a state in which copying of valid page(s) is not properly completed, the map manager 44 may not perform the mapping table update. It is because the map request is issued with old physical information if the state manger 42 requests a map update and a valid page copy is completed later. The map manager 44 may perform a map update operation to ensure accuracy only if the latest map table still points to the old physical address.

Figure 3:
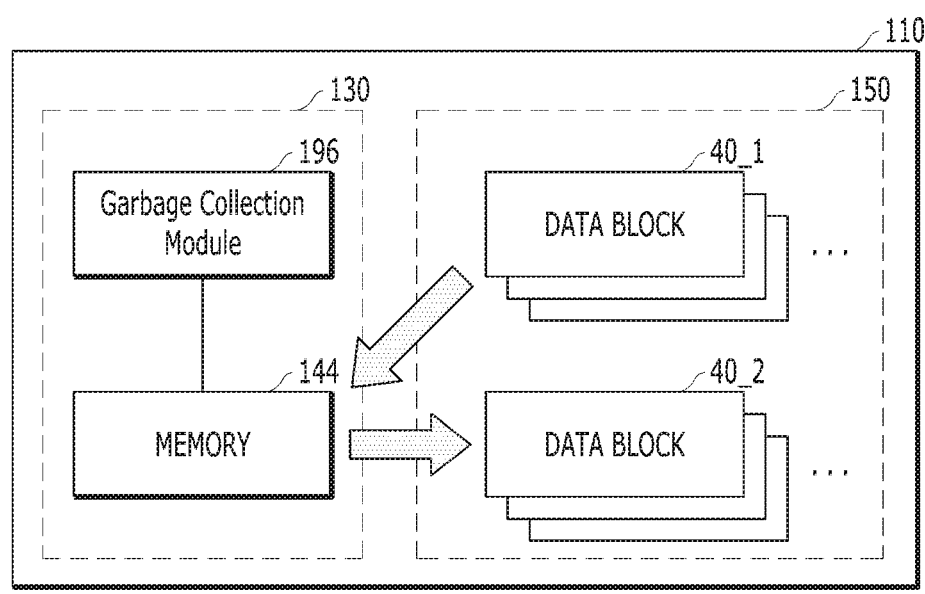
FIG. 3 illustrates an example of a garbage collection (GC) operation.

In accordance with an embodiment, at least one of the GC/WL 42, the MM 44, and the BW/BBM 48 may include a garbage collection module (GCM) 196 to be described in FIG. 3. For example, at least one of the GC/WL 42, the MM 44, and the BW/BBM 48 may perform a background operation even without a command received from the host I/F 132. The garbage collection module 196 may include a victim block manager 1961, a queue manager 1962, and a garbage collection manager 1963, which will be described in FIG. 4. The components of the garbage collection module are described in detail with reference to FIG. 4.

The memory I/F 142 may serve as a memory/storage I/F to interface the controller 130 and the memory device 150, such that the controller 130 controls the memory device 150 in response to a request from the host 102. When the memory device 150 is a flash memory, for example, a NAND flash memory, the memory I/F 142 may serve as a NAND flash controller (NFC), and generate a control signal of the memory device 150 and process data of the memory device 150 under control of the processor 134. The memory I/F 142 may support an operation of an interface for processing a command and data between the controller 130 and the memory device 150, for example, a NAND flash interface. In particular, the memory I/F 142 may support data input/output between the controller 130 and the memory device 150, and serve as a region to exchange data with the memory device 150. The memory I/F 142 may be driven through firmware referred to as a flash interface layer (FIL).

Furthermore, the memory I/F 142 may include a parallel command queue PQ and a serial command queue SQ as a plurality of device command queues capable of storing commands for performing tasks having different properties. Each of the parallel command queue PQ and the serial command queue SQ may store at least one device task (DT). The device task refers to a task in which the controller 130 performs the background operation of the memory device 150 in a specific state independently of the host 102, and may include background operations such as garbage collection, wear leveling, map table update, a rebuild operation due to SPO, and read reclaim. For example, the device task (DT) may include a command or information required for the garbage collection operation. The parallel command queue PQ may include a command or information for at least one garbage collection operation that may be performed in parallel with a host task operation. On the other hand, the serial command queue SQ may include a command or information for at least one garbage collection operation that may be performed alternately, i.e., in series, with the host task operation, that is, may operate during an idle period in which no host task operation is performed.

The memory device 150 may include a plurality of memory blocks. Each of plurality of memory blocks may be any of different types of memory blocks such as a single level cell (SLC) memory block, a multi-level cell (MLC) memory block or the like, according to the number of bits that can be stored or represented in one memory cell of the block. The SLC memory block includes a plurality of pages implemented by memory cells, each storing one bit of data. The SLC memory block may have high data input and output (I/O) operation performance and high durability. The MLC memory block includes a plurality of pages implemented by memory cells, each storing multi-bit data (e.g., two bits or more). The MLC memory block may have larger storage capacity in the same space than the SLC memory block. The MLC memory block may be highly integrated in terms of storage capacity. In an embodiment, the memory device 150 may be implemented with MLC memory blocks such as an MLC memory block, a triple level cell (TLC) memory block, a quadruple level cell (QLC) memory block and a combination thereof. The MLC memory block may include a plurality of pages implemented by memory cells, each capable of storing 2-bit data. The triple level cell (TLC) memory block may include a plurality of pages implemented by memory cells, each capable of storing 3-bit data. The quadruple level cell (QLC) memory block may include a plurality of pages implemented by memory cells, each capable of storing 4-bit data. In another embodiment, the memory device 150 may be implemented with a block including a plurality of pages implemented by memory cells, each capable of storing 5-bit or more bit data.

In an embodiment of the disclosure, the memory device 150 is embodied as a nonvolatile memory such as a flash memory such as a NAND flash memory or a NOR flash memory. But, in another embodiment, the memory device 150 may be implemented by at least one of a phase change random access memory (PCRAM), a ferroelectrics random access memory (FRAM), a spin injection magnetic memory (STT-RAM), and a spin transfer torque magnetic random access memory (STT-MRAM), or the like.

Figure 2:
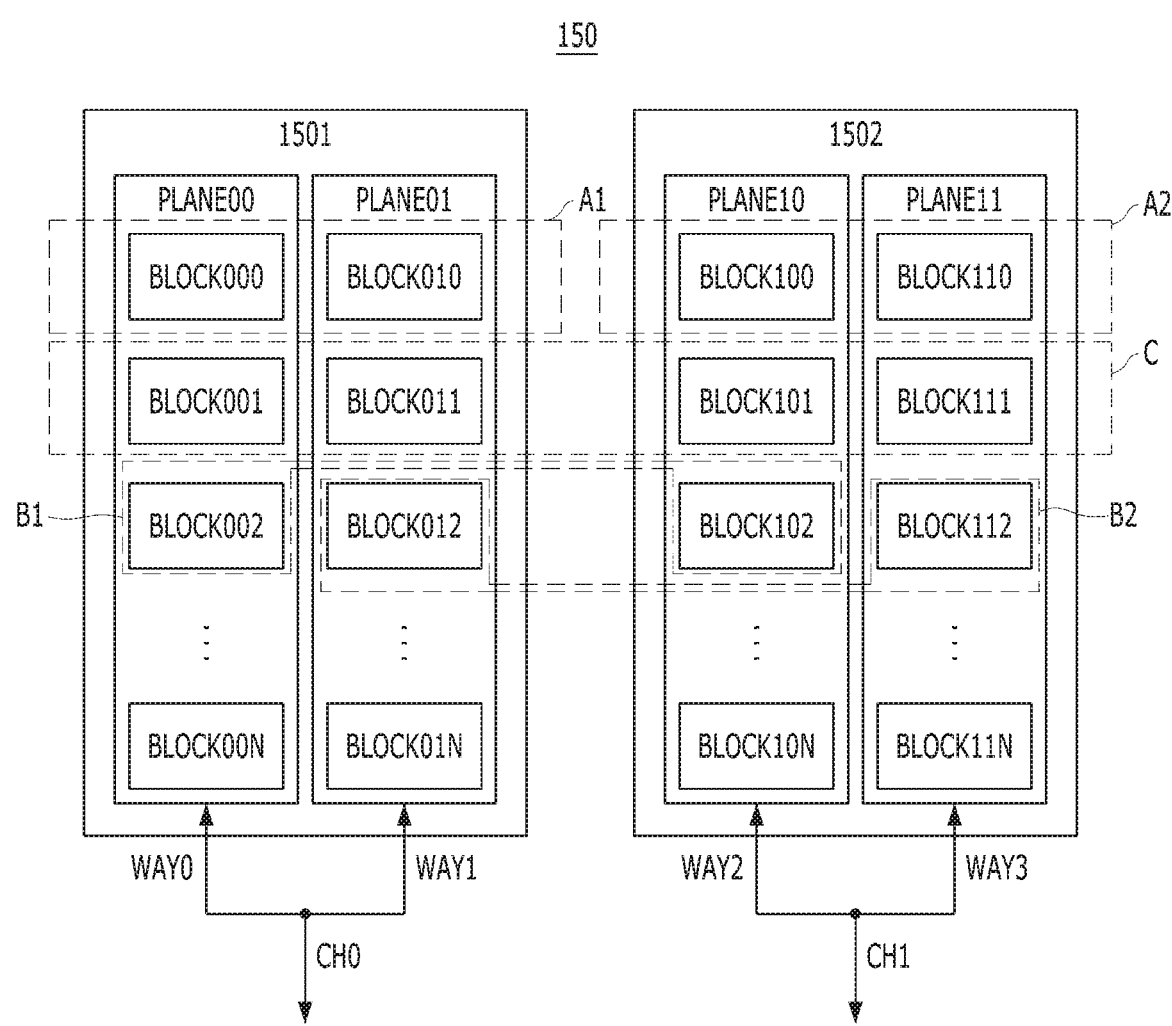
FIG. 2 is a diagram illustrating a super memory block in a memory system in accordance with an embodiment.

FIG. 2 is a diagram illustrating a super memory block in a memory system in accordance with an embodiment.

Referring to FIG. 2 the memory device 150 of the memory system 110 may include a plurality of memory dies 1501 to 150n. For example, the memory device 150 may include a first memory die 1501 and a second memory die 1502.

Each of the first and second memory dies 1501 and 1502 may include a plurality of planes. For example, the first memory die 1501 may include a first plane PLANE00 and a second plane PLANE01, and the second memory die 1502 may include a third plane PLANE10 and a fourth plane PLANE11. Each of the planes may include a plurality of, e.g., N, blocks. For example, the first plane PLANE00 may include memory blocks BLOCK000 to BLOCK00N. The second plane PLANE01 may include memory blocks BLOCK010 to BLCOK01N. The third plane PLANE10 may include memory blocks BLOCK100 to BLCOK10N. The fourth plane PLANE11 may include memory blocks BLOCK110 to BLCOK11N.

The first memory die 1501 is capable of inputting and outputting data through a zeroth channel CH0. The second memory die 1502 is capable of inputting and outputting data through a first channel CH1. The zeroth channel CH0 and the first channel CH1 may input and output data in an interleaving scheme.

The first memory die 1501 includes the plurality of planes PLANE00 and PLANE01 corresponding to a plurality of ways WAY0 and WAY1, respectively, capable of inputting and outputting data in the interleaving scheme by sharing the zeroth channel CH0.

The second memory die 1502 includes the plurality of planes PLANE10 and PLANE11 corresponding to a plurality of ways WAY2 and WAY3, respectively, capable of inputting and outputting data in the interleaving scheme by sharing the first channel CH1.

The plurality of memory blocks in the memory device 150 may be divided into groups based on physical locations where the same way or channel is used.

While the embodiment of FIG. 2 shows a configuration of the memory device 150 in which there are two dies, each having two planes, the present invention is not limited to this configuration. Any suitable die and plane configuration may be used based on system design considerations. The number of memory blocks in each plane may vary as well.

The controller 130 of FIG. 1 may group memory blocks which can be selected simultaneously, among the plurality of memory blocks in different dies or different planes, based on their physical locations, and manage the memory block groups as super memory blocks.

The scheme in which the controller 130 groups the memory blocks into super memory blocks and manages the super memory blocks may be performed in various ways according to design considerations. Three schemes are described below as examples.

In accordance with a first scheme, the controller 130 groups a memory block BLOCK000 of the first plane PLANE00 and a memory block BLOCK010 of the second plane PLANE01 in the first memory die 1501 in the memory device 150, and manages the grouped memory blocks BLOCK000 and BLOCK010 as a single super memory block A1. When the first scheme is applied to the second memory die 1502, the controller 130 may group a memory block BLOCK100 of the first plane PLANE10 and a memory block BLOCK110 of the second plane PLANE11 in the second memory die 1502, and manage the grouped memory blocks BLOCK100 and BLOCK110 as a single super memory block A2.

In accordance with a second scheme, the controller 130 groups a memory block BLOCK002 in the first plane PLANE00 of the first memory die 1501 and a memory block BLOCK102 in the first plane PLANE10 of the second memory die 1502, and manages the grouped memory blocks BLOCK002 and BLOCK102 as a single super memory block B1. In addition, according to the second scheme, the controller 130 may group a memory block BLOCK012 in the second plane PLANE01 of the first memory die 1501 and a memory block BLOCK112 in the second plane PLANE11 of the second memory die 1502, and manage the grouped memory blocks BLOCK012 and BLOCK112 as a single super memory block B2.

In accordance with a third scheme, the controller 130 groups a memory block BLOCK001 in the first plane PLANE00 of the first memory die 1501, a memory block BLOCK011 in the second plane PLANE01 of the first memory die 1501, a memory block BLOCK101 in the first plane PLANE10 of the second memory die 1502, and a memory block BLOCK111 in the second plane PLANE11 of the second memory die 1502, and manages the grouped memory blocks BLOCK001, BLOCK011, BLOCK101 and BLOCK111 as a single super memory block C.

Accordingly, memory blocks in each of the super memory blocks may be substantially simultaneously selected through the interleaving scheme such as a channel interleaving scheme, a memory die interleaving scheme, a memory chip interleaving scheme or a way interleaving scheme.

In accordance with embodiments of the invention, based on the pattern of the first logical block address (LBA) and the second LBA, the size of the map segment may be variably adjusted and updated to the memory device 150, thereby reducing the number of updates to the memory device 150.

FIG. 3 illustrates an example of a GC operation.

Referring to FIG. 3, the amount of invalid data stored in a plurality of data blocks 40_1 in the memory device 150 may increase as more program commands from the controller 130 are processed. In order to reuse the data block 40_1 in which such invalid data are stored, an internal operation (e.g. GC or wear leveling) may be performed. For example, a GC module 196 in the controller 130 may perform GC to change the data block 40_1 having the valid data stored therein into a free block. That is, when GC is triggered, which may be at set periodic times or when the number of remaining free blocks is equal to or less than a threshold value, the GC module 196 may identify closed blocks among the plurality of data blocks 40_1 within the memory device 150. The GC module 196 may select, as a victim block, a closed block having a smaller number of valid pages than a threshold value, among the closed blocks. The reason to select a closed block having a small number of valid pages is that, when a GC operation is performed on a closed block having a large number of valid pages, the time and cost required for performing the GC operation may be increased, and the lifetime of the memory device may be shortened. Then, the GC module 196 may copy valid data in the victim block and store such data in a destination block as a free block 40_2 on which a program operation has not been performed. The GC module 196 may erase the victim block after the valid data are copied and stored in the destination block.

In order to move data from the closed block of the memory device 150 to the free block during the above-described GC operation, the controller 130 may read the data from the closed block of the memory device 150, load the read data to the memory 144, and then program the data stored in the memory 144 to the free block. Since the controller 130 performs a read/program operation on the memory device 150, the controller 130 may stop the GC operation to perform an operation corresponding to a read command or program command, when the command is transferred from the outside (e.g. the host 102 in FIG. 1) while the GC operation is performed.

When a program operation and a GC operation are performed in parallel to each other in order to reduce the time and cost required for performing the GC operation, the controller 130 may not stop the GC operation. In other words, the controller 130 may select a destination block from a die different from a die including an open block on which the program operation can be performed, and move the valid data of the victim block to the destination block, in order to perform the program operation and the GC operation in parallel. This process is described in detail with reference to FIGS. 4 to 10. In the present embodiment, the plurality of dies included in the memory device may be individually managed by one or more channels and ways. Furthermore, one or more of the embodiments can be applied to both the memory device 150 composed of super blocks and the memory device 150 which is not composed of super blocks.

Figure 4:
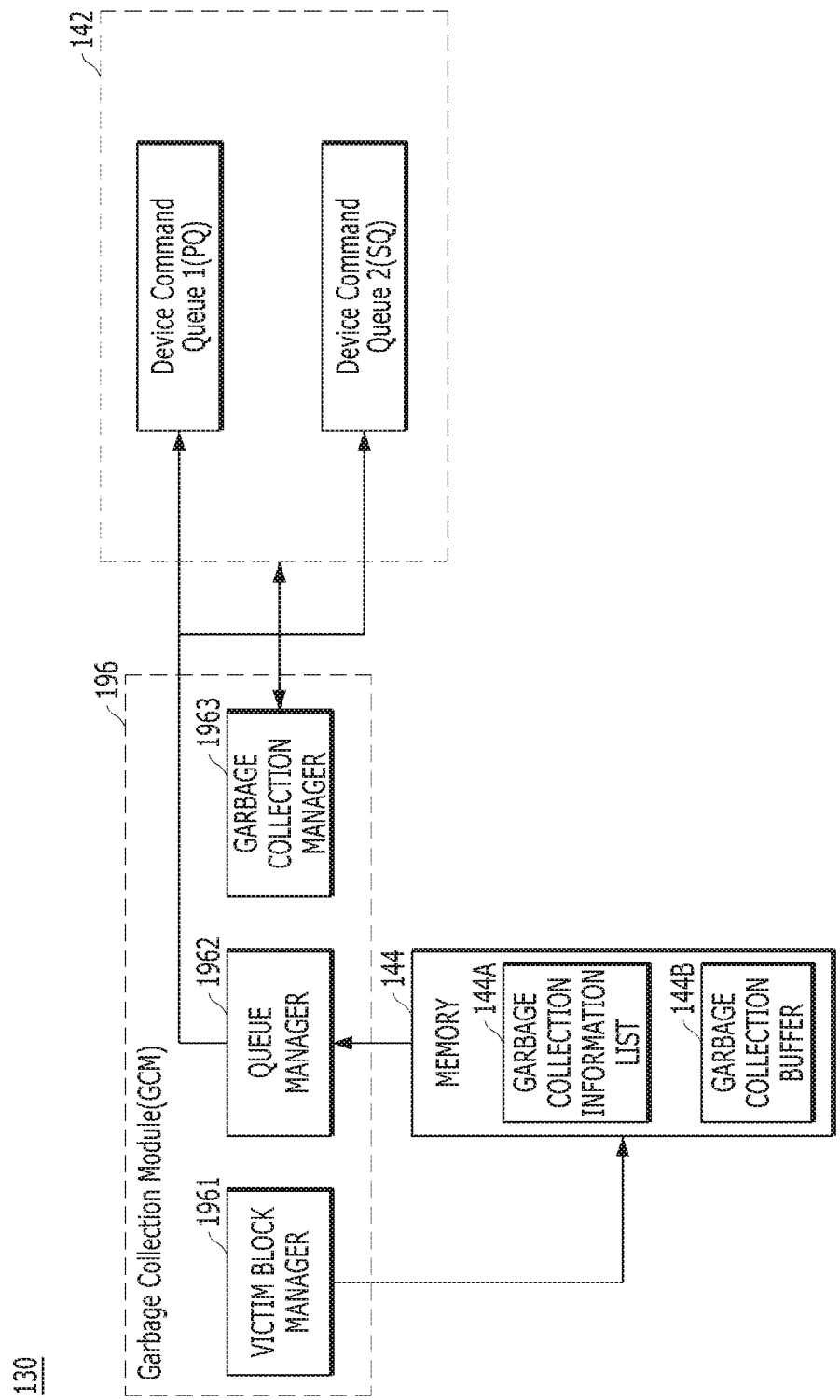
FIG. 4 is a diagram for explaining a data processing operation of the memory system in accordance with an embodiment.

FIG. 4 is a diagram for explaining a data processing operation of the memory system in accordance with an embodiment. FIG. 4 illustrates only components and configurations related to the processing described below.

The garbage collection module 196 described in FIG. 1 may include the victim block manager 1961, the queue manager 1962, and the garbage collection manager 1963. Furthermore, the memory I/F 142 described in FIG. 1 may include the parallel and serial command queues PQ and SQ. Furthermore, the memory device 150 may include a plurality of dies.

The victim block manager 1961 may determine whether a garbage collection operation is executable in parallel with a host task operation, detect a victim block, and then store, in the memory 144, garbage collection information $Info_{GC}$ on the victim block and status information $Info_{ST}$ corresponding to the garbage collection information $Info_{GC}$. The victim block manager 1961 may determine whether a garbage collection operation is executable in parallel with a host task operation according to whether a closed block exists in the remaining dies, i.e., all dies except an $n^{th}$ die that includes an open block. For example, in the case of the $n^{th}$ die including the open block, it is difficult to perform a garbage collection operation of moving data inside the memory system in order to program data transmitted from the host to the memory system. On the other hand, in the case of other dies including no open block, since paths such as a channel, a way and the like for transferring data are not used, the garbage collection operation may be performed through an available channel, way and the like. The garbage collection information $Info_{GC}$ may include address information of the victim block. The victim block manager 1961 may detect, as the victim block, a closed block, in which a valid page ratio (VPR) or a valid page count (VPC) is less than a threshold value TH among a plurality of closed blocks, which is described in detail below with reference to FIG. 6.

The queue manager 1962 may determine a garbage collection type according to the status information $Info_{ST}$ corresponding to the garbage collection information $Info_{GC}$, which is stored in the memory 144. The queue manager 1962 may classify the garbage collection information $Info_{GC}$ into a parallel or serial garbage collection group according to the corresponding status information $Info_{ST}$. The Items of $Info_{GC}$ in the parallel garbage collection group may indicate performing garbage collection in parallel with a host task, and items of $Info_{GC}$ in the serial garbage collection group may indicate performing garbage collection during an idle period (period in which no host task is processed).

Figure 8:
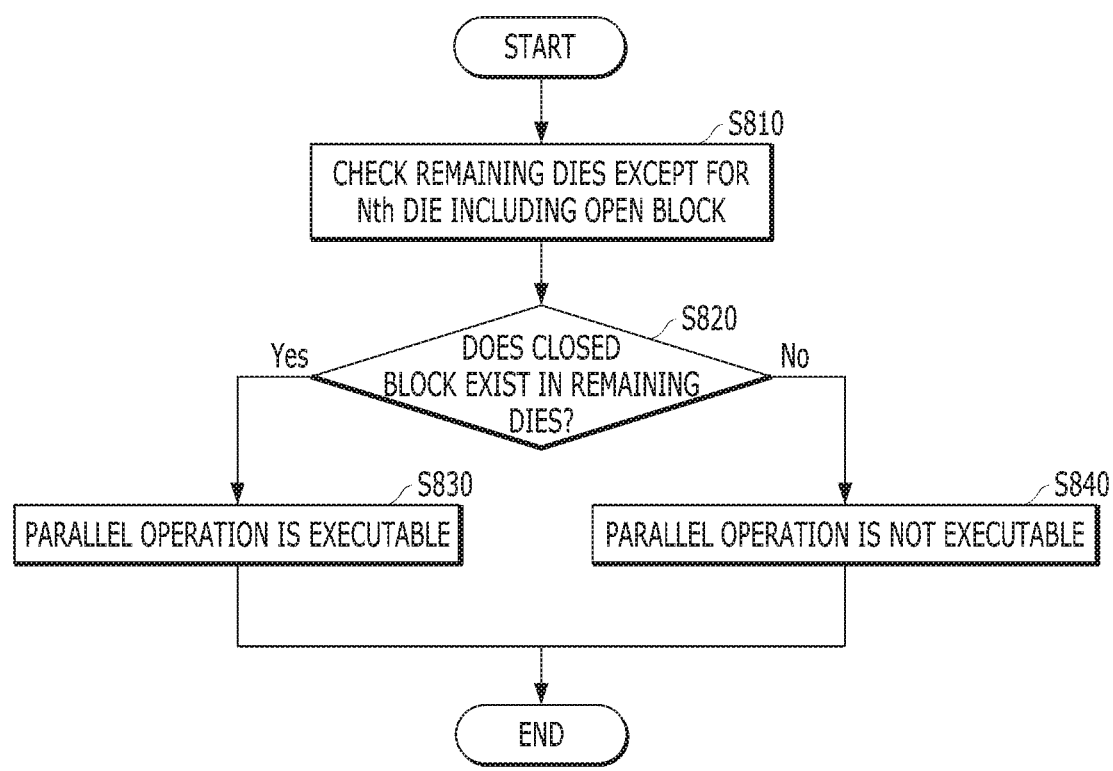

Furthermore, the queue manager 1962 may queue the garbage collection information $Info_{GC}$, which are respectively classified into the parallel and serial garbage collection group, to the parallel command queue PQ and the serial command queue SQ respectively corresponding to the parallel and serial garbage collection group, which is described in detail with respect to FIG. 8.

The garbage collection manager 1963 determines a type of garbage collection to be performed according to a trigger event, which may be set time that recurs periodically. The garbage collection manager 1963 checks the garbage collection information $Info_{GC}$ queued in the parallel and serial command queues PQ and SQ in the memory I/F 142 according to the type to be performed.

Furthermore, the garbage collection manager 1963 may copy all valid pages of the victim block to the destination block according to the garbage collection information $Info_{GC}$ and then delete the corresponding garbage collection information $Info_{GC}$ from the parallel or serial command queue PQ or SQ, which is described in detail with reference to FIG. 10.

The memory 144 may include a garbage collection information list 144A and a garbage collection buffer 144B. The garbage collection information list 144A may include garbage collection information $Info_{GC}$ on a victim block and status information $Info_{ST}$ corresponding to the garbage collection information $Info_{GC}$.

The status information $Info_{ST}$ may be 1-bit flag information and may be expressed as 1' or 0'. For example, when a victim block is detected from a die including no open block, the status information $Info_{ST}$ of the victim block may be expressed as 1. On the other hand, when the victim block is detected from a die including the open block, the status information $Info_{ST}$ of the victim block may be expressed as 0. Of course, the reverse convention may be used.

The garbage collection buffer 144B is configured to temporarily store valid data to be moved from the victim block to the destination block during the garbage collection.

Figure 5:
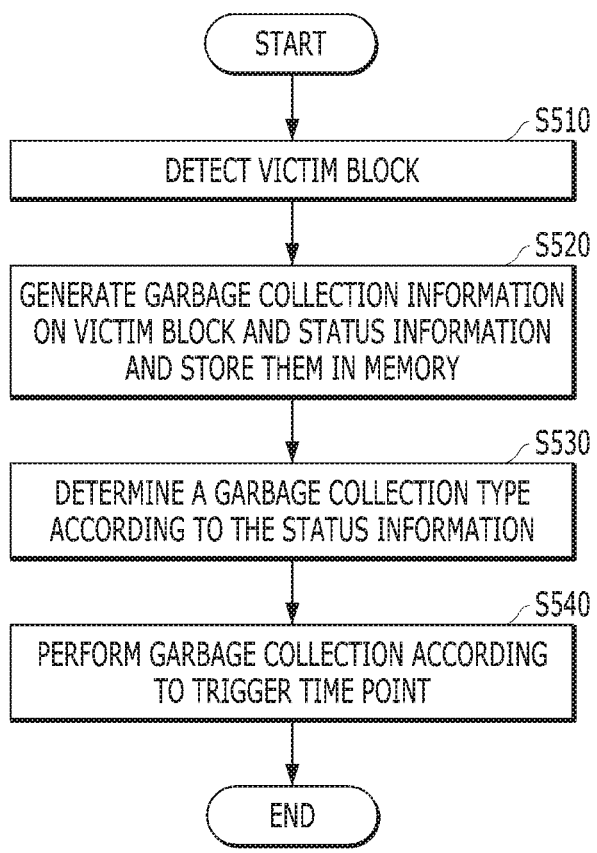
FIG. 5 is a flowchart illustrating an operation process of a memory system in accordance with an embodiment.

FIG. 5 is a flowchart illustrating an operation process of the memory system 110 in accordance with an embodiment.

Referring to FIG. 5, in step S510, the garbage collection module 196 may determine whether the parallel operation is executable and then detect a victim block according to the valid page count. That is, the garbage collection module 196 may determine whether a garbage collection operation is executable in parallel with a host task operation by determining whether a closed block exists in any of the dies except the $n^{th}$ die including the open block. Then, the garbage collection module 196 may detect, as a victim block, any of a closed block in which the valid page count is equal to or larger than a threshold value, a closed block in which a read count is equal to or larger than the threshold value, a closed block in which an erase count is less than the threshold value, and a closed block in which program fail has occurred. For example, the garbage collection module 196 may detect, as the victim block, a closed block, in which the valid page count (VPC) or the valid page ratio (VPR) is less than the threshold value TH, among the plurality of closed blocks.

In step S520, the garbage collection module 196 may generate the garbage collection information $Info_{GC}$ on the victim block and status information $Info_{ST}$ corresponding to the garbage collection information $Info_{GC}$ and store the garbage collection information $Info_{GC}$ and the corresponding status information $Info_{ST}$ in the memory 144. The garbage collection information $Info_{GC}$ may include address information of the victim block.

In step S530, the garbage collection module 196 may determine a garbage collection type according to the status information $Info_{ST}$ of the garbage collection information $Info_{GC}$ stored in the memory 144. In accordance with an embodiment, the garbage collection type may be determined using the status information of the victim block. The garbage collection module 196 may queue the garbage collection information $Info_{GC}$ to the parallel command queue or the serial command queue SQ according to the garbage collection type.

In step S540, the garbage collection module 196 determines a type of garbage collection to be performed according to a trigger time. For example, the trigger time may depend on a host task operation. When the host task operation is performed, the garbage collection module 196 checks garbage collection information $Info_{GC}$ queued in the parallel command queue PQ, in order to perform garbage collection in parallel with the host task operation currently being performed. On the other hand, when an idle period, during which no host task operation is performed, starts, the garbage collection module 196 checks garbage collection information $Info_{GC}$ queued in the serial command queue SQ, in order to perform garbage collection as a device task operation during the idle period. Then, the garbage collection module 196 copies all valid pages of the victim block, based on the garbage collection information $Info_{GC}$ queued in the PQ or the SQ, into a destination block. The garbage collection module 196 may delete garbage collection information $Info_{GC}$, on which the garbage collection operation has been completed, from the parallel or serial command queue PQ or SQ.

Figure 6:
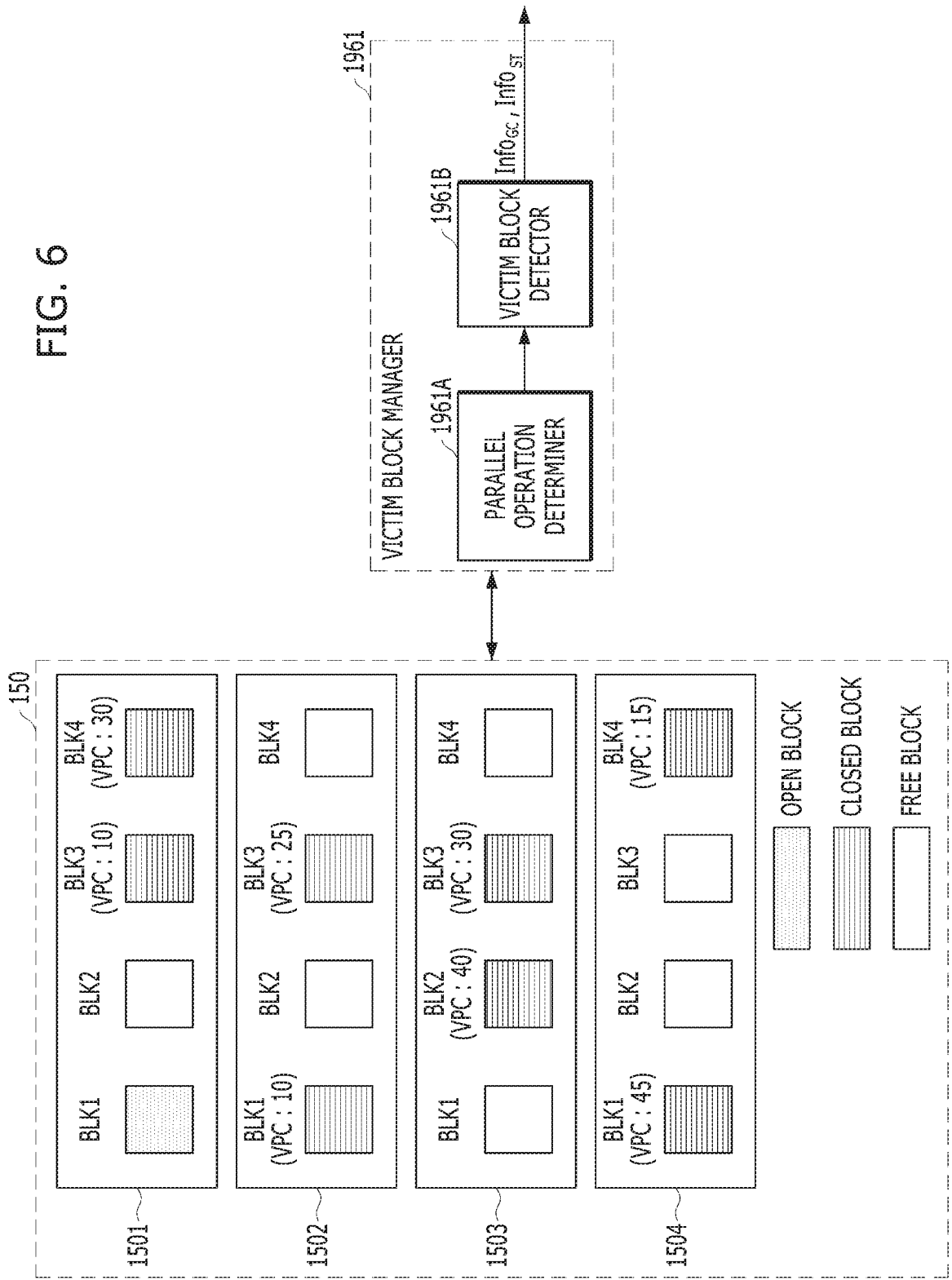
FIG. 6 is a diagram illustrating a detailed configuration of a victim block manager in accordance with an embodiment.

FIG. 6 is a diagram illustrating a detailed configuration of the victim block manager 1961 in accordance with an embodiment.

Referring to FIG. 6, the victim block manager 1961 may include a parallel operation determiner 1961A and a victim block detector 1961B. The victim block manager 1961 may detect the victim block from the plurality of closed blocks included in the memory device 150.

The memory device 150 may include a plurality of dies. For example, the plurality of dies may include a first die 1501, a second die 1502, a third die 1503, and a fourth die 1504. Each of the plurality of dies may include a plurality of memory blocks. The plurality of memory blocks may include a first memory block BLK1, a second memory block BLK2, a third memory block BLK3, and a fourth memory block BLK4. This is an arrangement to which the present invention is not limited. Each of the plurality of memory blocks BLK1 to BLK4 may be a free block, an open block or a closed block. A free block is a block in which no data is stored. For example, the second memory block BLK2 of the first die 1501, the second memory block BLK2 and the fourth memory block BLK4 of the second die 1502, the first memory block BLK1 and the fourth memory block BLK4 of the third die 1503, and the second memory block BLK2 and the third memory block BLK3 of the fourth die 1504 may be free blocks. An open block is a block in which data is stored and in which there is at least one page available for storing data. For example, the first memory block BLK1 of the first die 1501 may be an open block. A closed block is a block in which there is no page available for storing data. For example, the third memory block BLK3 and the fourth memory block BLK4 of the first die 1501, the first memory block BLK1 and the third memory block BLK3 of the second die 1502, the second memory block BLK2 and the third memory block BLK3 of the third die 1503, and the first memory block BLK1 and the fourth memory block BLK4 of the fourth die 1504 may be closed blocks.

In order to effectively perform in parallel a garbage collection operation and a host task operation without affecting latency, the garbage collection module may classify the garbage collection information $Info_{GC}$ according to the status information $Info_{ST}$ corresponding to the garbage collection information $Info_{GC}$ and queue the garbage collection information $Info_{GC}$ to the parallel or serial command queues PQ and SQ according to the classification. That is, the garbage collection module may classify certain garbage collection information $Info_{GC}$ into the parallel garbage collection group for performing the garbage collection operation in parallel with the host task operation and classify other garbage collection information $Info_{GC}$ into the serial garbage collection group for performing the garbage collection operation, for example, only when the host task operation is not performed (in the case of the idle period).

To this end, when a victim block is detected in a die that includes an open block and in which a host task operation may be performed, the garbage collection information $Info_{GC}$ of the victim block may be placed in the serial garbage collection group. On the other hand, when a victim block is detected in any other die (excluding the die with the open block), the garbage collection information $Info_{GC}$ of the victim block may be placed in the parallel garbage collection group. When the garbage collection information $Info_{GC}$ of the victim block belongs to the serial garbage collection group, such information may be queued in the serial command queue SQ, and when the garbage collection information $Info_{GC}$ of the victim block belongs to the parallel garbage collection group, such information may be queued in the parallel command queue PQ. The garbage collection operation may be performed on the victim block according to the garbage collection information $Info_{GC}$ queued in the parallel command queue PQ, in parallel with a host task operation. The garbage collection operation may be performed on the victim block of the garbage collection information $Info_{GC}$ queued in the serial command queue SQ, only during idle time. Therefore, it is possible to substantially prevent performance degradation due to the garbage collection operation, which is described in detail through the parallel operation determiner 1961A and the victim block detector 1961B.

First, the parallel operation determiner 1961A determines whether it is possible to perform a garbage collection operation in parallel with a host task operation, when a garbage collection event occurs. Depending on the result of that determination, the parallel operation determiner 1961A may perform the garbage collection in parallel or serially with the host task operation, as described below.

In order to determine whether it is possible to perform a garbage collection operation in parallel with a host task operation, the parallel operation determiner 1961A checks the remaining dies (other than the $n^{th}$ die including the open block) among the plurality of dies. For example, it can be seen in FIG. 6 that the first die 1501 includes an open block, i.e., the first memory block BLK1. Each of the second die 1502, the third die 1503, and the fourth die 1504 also include at least one open block.

The parallel operation determiner 1961A determines whether at least one closed block exists in the remaining dies. As a result of the determination, when at least one closed block exists in the remaining dies, the parallel operation determiner 1961A determines that the host task operation and the device task operation may be performed in parallel. For example, the second die 1502 includes two closed blocks BLK1 and BLK3), the third die 1503 includes two closed blocks (BLK2 and BLK3), and the fourth die 1504 includes two closed blocks (BLK1 and BLK4).

On the other hand, when no closed block exists in the remaining dies and one or more closed blocks exist in the $n^{th}$ die that includes the open block, since there is no closed block selectable as the victim block among the remaining dies, the parallel operation determiner 1961A determines that the host task operation and the device task operation may not be performed in parallel.

The victim block detector 1961B may detect at least one victim block from the plurality of closed blocks included in the plurality of dies. There are two methods to detect the victim block. In the first method, a criterion of the threshold value TH may be set as a valid page ratio, and in the second method, the criterion of the threshold value TH may be set as an average valid page count.

First, a case where the threshold value TH is set as the valid page ratio is described. The victim block detector 1961B may detect, as the victim block, a closed block having a valid page ratio or less among the plurality of closed blocks included in the remaining dies. For example, the following description is given on the assumption that each memory block includes 100 pages. The victim block detector 1961B may select, as the victim block, a closed block having a valid page count of 25% or less, which is the valid page ratio, among the plurality of closed blocks. The valid page ratio may be set to any suitable value based on system conditions and performance objectives. In the second die 1502, the valid page count (VPC) and the valid page ratio of BLK1 are 10 and 10%, respectively, and the valid page count (VPC) and the valid page ratio of BLK3 are 25 and 25%, respectively. In the third die 1503, the valid page count (VPC) and the valid page ratio of BLK2 are 40 and 40%, respectively, and the valid page count (VPC) and the valid page ratio of BLK3 are 30 and 30%, respectively. In the fourth die 1504, the valid page count (VPC) and the valid page ratio of BLK1 are 45 and 45%, respectively, and the valid page count (VPC) and the valid page ratio of BLK4 are 15 and 15%, respectively. The closed blocks having a valid page ratio of 25% or less are BLK1 and BLK3 in the second die 1502 and BLK4 in the fourth die 1504; these closed blocks may be detected as the victim blocks.

Secondly, a case where a second threshold value TH is set as the average valid page count is described. The victim block detector 1961B may calculate the average valid page count by using the total number of pages in the plurality of closed blocks in the remaining dies, in order to set the threshold value TH. For example, the calculated average valid page count is 28. The victim block detector 1961B may select closed blocks having a valid page count of 28 or less as the victim blocks. The closed blocks having a valid page count of 28 or less are BLK1 and BLK3 in the second die 1502 and BLK4 in the fourth die 1504; these closed blocks may be detected as the victim blocks. The victim block detector 1961B may detect the victim blocks in this manner.

The victim block detector 1961B temporarily stores garbage collection information $Info_{GC}$ on the victim blocks and status information $Info_{ST}$ corresponding to the garbage collection information $Info_{GC}$ in the garbage collection information list 144A included in the memory 144. That is, when the victim blocks are detected from the remaining dies including no open block, the victim block detector 1961B may record the garbage collection information $Info_{GC}$ on the victim blocks and the status information $Info_{ST}$ having a value of '1' in the garbage collection information list 144A. On the other hand, when the victim blocks are detected from the $n^{th}$ die including the open block, the victim block detector 1961B may record the garbage collection information $Info_{GC}$ on the victim blocks and the status information $Info_{ST}$ having a value of '0' in the garbage collection information list 144A.

Figure 7:
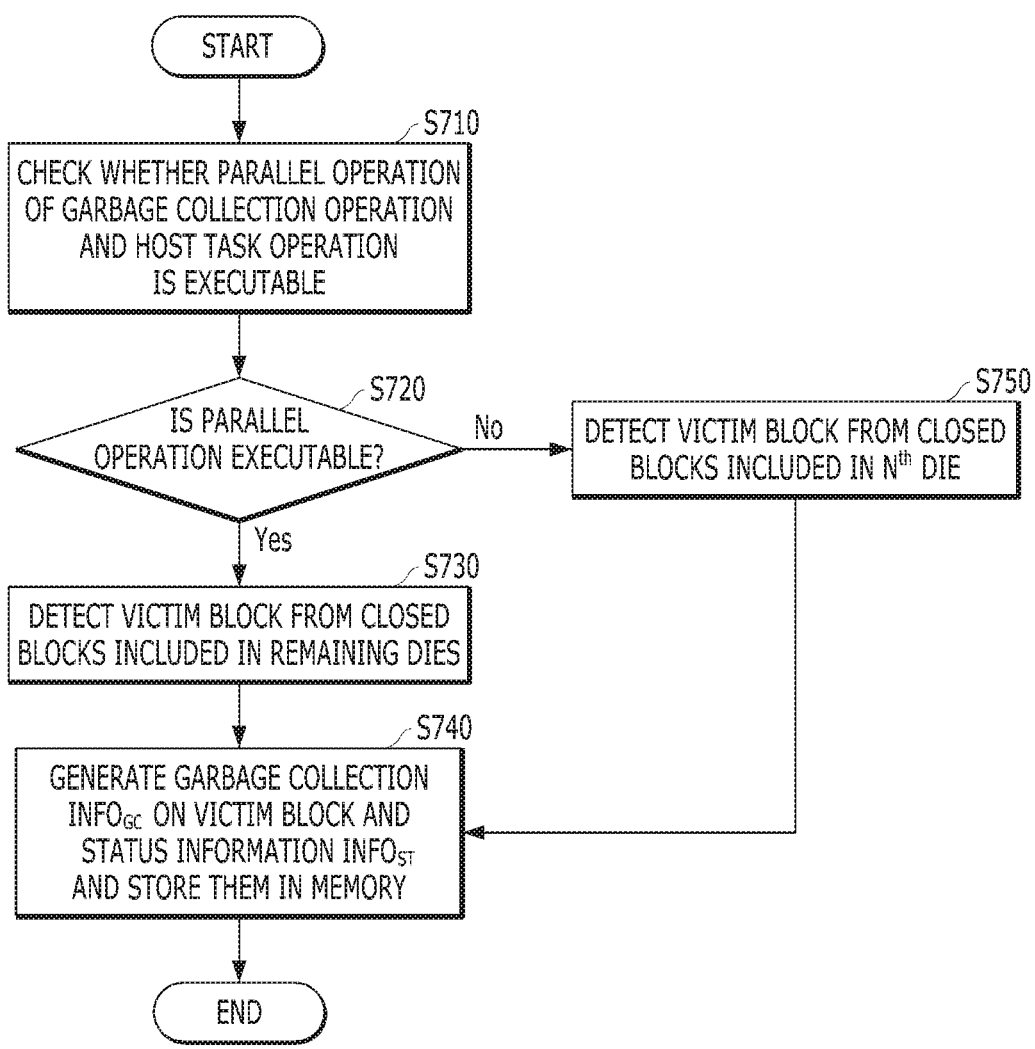
FIG. 7 and FIG. 8 are flowcharts illustrating an operation process of a victim block manager in accordance with an embodiment.

FIG. 7 and FIG. 8 are flowcharts illustrating an operation process of the victim block manager in accordance with an embodiment.

Referring to FIG. 7, in step S710 and step S720, the victim block manager 1961 determines whether the parallel operation of the garbage collection operation and the host task operation is executable. Depending on the result of that determination, the victim block manager 1961 may perform the garbage collection by determining either the parallel garbage collection operation or the serial garbage collection operation to be described below. A method of determining whether the garbage collection operation and the host task operation are executable in parallel is described through FIG. 8.

Referring to FIG. 8, in step S810, the victim block manager 1961 detects at least one, e.g., an $n^{th}$, die that includes an open block among a plurality of dies and then checks the remaining dies, except for the $n^{th}$ die, for dosed blocks.

In step S820, the victim block manager 1961 determines whether one or more closed blocks exist in the remaining dies. As a result of the determination, when one or more dosed blocks exist the remaining dies ("YES" in step S820), the victim block manager 1961 determines that it is possible to perform the garbage collection operation in parallel with a write operation (step S830).

On the other hand, when no closed block exists in the remaining dies and one or more closed blocks exist in the $n^{th}$ die which includes an open block ("NO" in step S820), the victim block manager 1961 determines that it is not possible to perform the garbage collection operation in parallel with the write operation because no closed blocks selectable as victim blocks exist in the remaining dies (step S840).

Referring back to FIG. 7, when it is determined according to the result determined through FIG. 8 that it is possible to perform the garbage collection operation in parallel with the host task operation ("YES" in step S720), the victim block manager 1961 detects a victim block from the plurality of closed blocks included in the remaining dies (step S730). On the other hand, when it is not possible to perform the garbage collection operation in parallel with the host task operation ("NO" in step S720), the victim block manager 1961 detects a victim block from the closed blocks included in the $n^{th}$ die (step S750).

In step S740, the victim block manager 1961 may generate garbage collection information $Info_{GC}$ on the victim block detected in step S730 and step S750 and status information $Info_{ST}$ corresponding to the garbage collection information $Info_{GC}$ and store the garbage collection information $Info_{GC}$ and the status information $Info_{ST}$ in the garbage collection information list 144A included in the memory 144.

Figure 9:
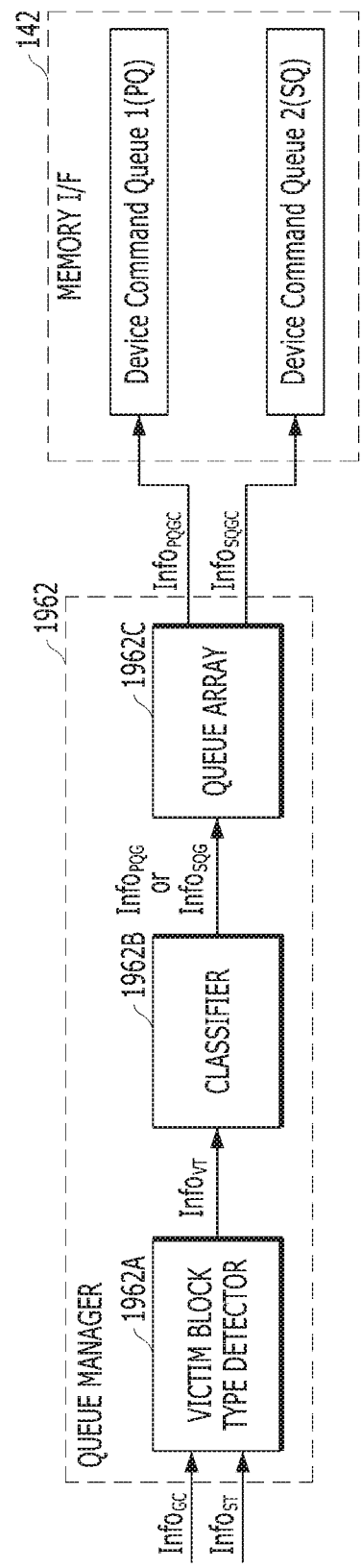
FIG. 9 is a diagram illustrating a detailed configuration of a queue manager in accordance with an embodiment.

FIG. 9 is a diagram illustrating a detailed configuration of the queue manager 1962 in accordance with an embodiment.

Referring to FIG. 9, the queue manager 1962 may include a victim block type detector 1962A, a classifier 1962B, and a queue array 1962C.

The victim block type detector 1962A may determine type information $Info_{VT}$ of a victim block by using the status information $Info_{ST}$ corresponding to the garbage collection information $Info_{GC}$ of the victim block, the garbage collection information $Info_{GC}$ being stored in the garbage collection information list 144A. That is, the victim block type detector 1962A may determine that the type of the victim block is a parallel type or a serial type according to the status information $Info_{ST}$ corresponding to the garbage collection information $Info_{GC}$ of the victim block. When the status information $Info_{ST}$ corresponding to the garbage collection information $Info_{GC}$ is '1', the victim block type detector 1962A detects the type information $Info_{VT}$ of the victim block corresponding to the garbage collection information $Info_{GC}$ as the parallel type. On the other hand, when the status information $Info_{ST}$ corresponding to the garbage collection information $Info_{GC}$ is '0', the victim block type detector 1962A detects the type information $Info_{VT}$ of the victim block corresponding to the garbage collection information $Info_{GC}$ as the serial type. The victim block type detector 1962A may provide the classifier 1962B with the type information $Info_{VT}$ of the victim block detected for each victim block.

The classifier 1962B may classify the garbage collection information $Info_{GC}$ into the parallel or serial garbage collection groups according to the type information $Info_{VT}$ of the victim block, the type information $Info_{VT}$ being received from the victim block type detector 1962A. When the type information $Info_{VT}$ of the victim block is the parallel type, the classifier 1962B may classify the garbage collection information $Info_{GC}$ into the parallel garbage collection group, and when the type information $Info_{VT}$ of the victim block is the serial type, the classifier 1962B may classify the garbage collection information $Info_{GC}$ into the serial garbage collection group. The classifier 1962B transmits the garbage collection information $Info_{GC}$ classified into the parallel or serial garbage collection groups to the queue array 1962C.

The queue array 1962C may sequentially queue the garbage collection information $Info_{GC}$ classified into the parallel or serial garbage collection group $Info_{PQG}$ or $Info_{SQG}$ to a corresponding queue, i.e., the parallel command queue PQ or the serial command queue SQ. The queue array 1962C may queue the garbage collection information $Info_{GC}$ classified into the parallel garbage collection group $Info_{PQG}$ to the parallel command queue PQ and queue the garbage collection information $Info_{GC}$ classified into the serial garbage collection group $Info_{SQG}$ to the serial command queue SQ.

Figure 10:
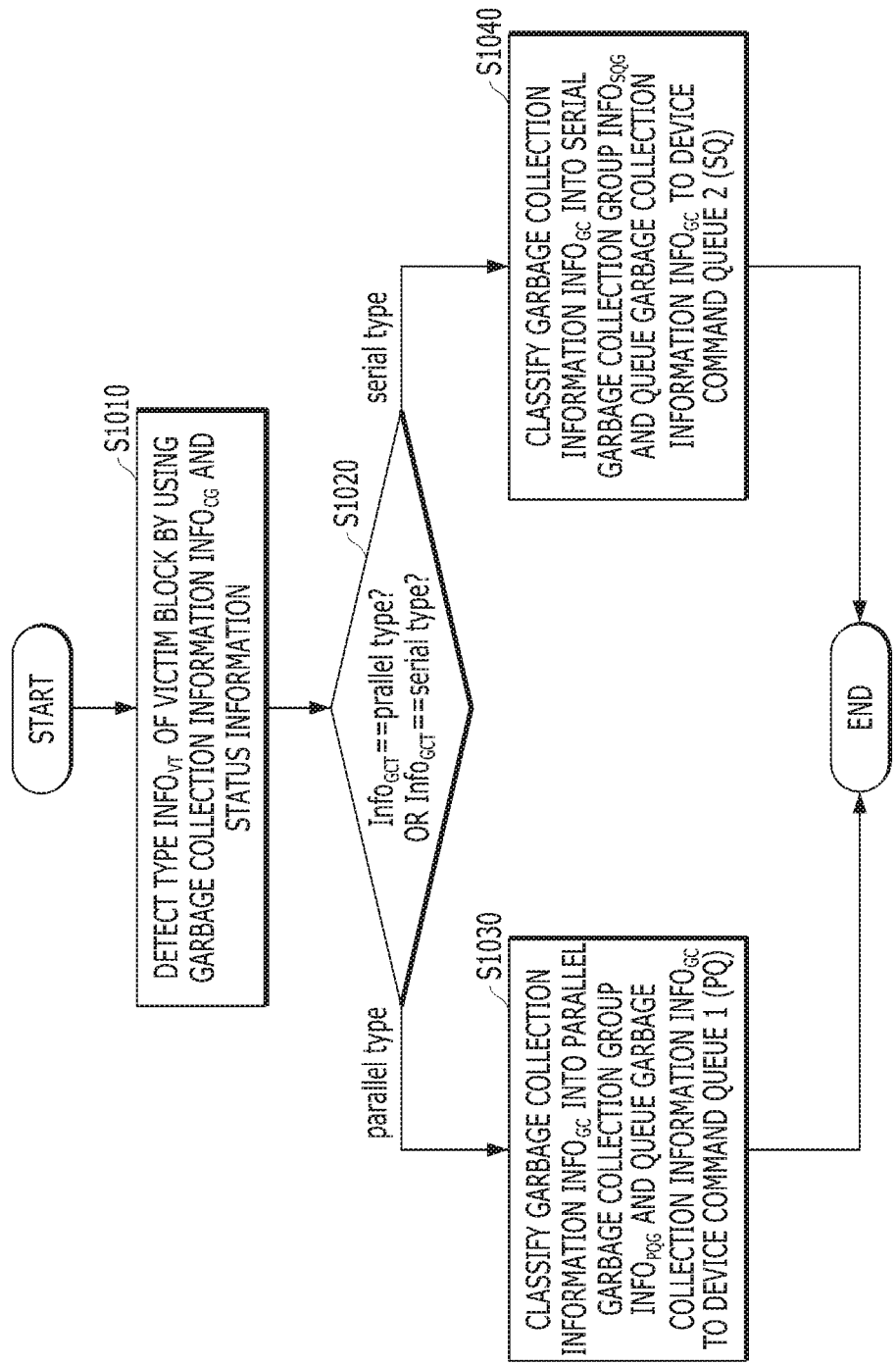
FIG. 10 is a flowchart illustrating an operation process of a queue manager in accordance with an embodiment.

FIG. 10 is a flowchart illustrating an operation process of the queue manager 1962 in accordance with an embodiment.

Referring to FIG. 10, in step S1010, the queue manager 1962 may determine the type information $Info_{VT}$ of a victim block by using the status information $Info_{ST}$ corresponding to the garbage collection information $Info_{GC}$ of the victim block, the garbage collection information $Info_{GC}$ being stored in the garbage collection information list 144A.

In step S1020, the queue manager 1962 may determine whether the type of the victim block is a parallel type or a serial type, a type of the victim block according to which the garbage collection operation is performed in parallel or in series according to the status information $Info_{ST}$ corresponding to the garbage collection information $Info_{GC}$. When the status information $Info_{ST}$ corresponding to the garbage collection information $Info_{GC}$ is '1', the queue manager 1962 determines the type information $Info_{VT}$ of the victim block as the parallel type. On the other hand, when the status information $Info_{ST}$ corresponding to the garbage collection information $Info_{GC}$ is '0', the queue manager 1962 determines the type information $Info_{VT}$ of the victim block as the serial type.

In step S1030, when the type information $Info_{VT}$ of the victim block is the parallel type, the queue manager 1962 classifies the garbage collection information $Info_{GC}$ into the parallel garbage collection group. Then, the queue manager 1962 queues the garbage collection information $Info_{GC}$ classified into the parallel garbage collection group $Info_{PQG}$ to the parallel command queue PQ.

In step S1040, when the type information $Info_{VT}$ of the victim block is the serial type, the queue manager 1962 classifies the garbage collection information $Info_{GC}$ into the serial garbage collection group. Then, the queue manager 1962 queues the garbage collection information $Info_{GC}$ classified into the serial garbage collection group $Info_{SQG}$ to the second device command queue SQ.

The victim block detector 1961B may detect at least one victim block from the plurality of closed blocks included in the plurality of dies. There are two methods to detect the victim block. In the first method, the criterion of the threshold value TH may be set as the valid page ratio, and in the second method, the criterion of the threshold value TH may be set as the average valid page count.

Figure 11:
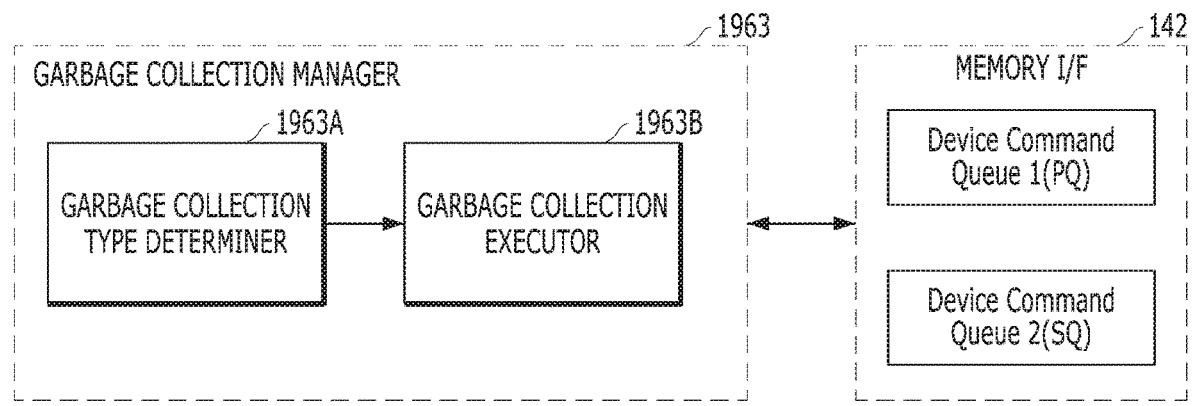
FIG. 11 is a diagram illustrating components of a garbage collection manager in accordance with an embodiment.

FIG. 11 is a diagram illustrating components of the garbage collection manager 1963 in accordance with an embodiment.

Referring to FIG. 11, the garbage collection manager 1963 may include a garbage collection type determiner 1963A and a garbage collection executor 1963B.

The garbage collection type determiner 1963A determines a type of garbage collection to be performed according to a trigger time point. For example, the trigger time point may depend on the host task operation. When the host task operation is performed, the garbage collection type determiner 1963A determines whether there is garbage collection information $Info_{GC}$ queued in the parallel command queue PQ, in order to perform garbage collection in parallel with the host task operation being performed. As a result of the determination, when there is the garbage collection information $Info_{GC}$ queued in the parallel command queue PQ, the garbage collection type determiner 1963A provides the garbage collection information $Info_{GC}$ queued in the parallel command queue PQ to the garbage collection executor 1963B. On the other hand, when there is no garbage collection information Info$_{GC}$ queued in the parallel command queue PQ, since it is not possible to perform the garbage collection operation in parallel with the host task operation being performed, the garbage collection type determiner 1963A provides the garbage collection information Info$_{GC}$ queued in the serial command queue SQ to the garbage collection executor 1963B, in order to perform the garbage collection operation in an idle period after the currently-being-performed host task operation is completed.

On the other hand, during the idle period, the garbage collection type determiner 1963A determines whether there is garbage collection information Info$_{GC}$ queued in the serial command queue SQ. As a result of the determination, when there is the garbage collection information Info$_{GC}$ queued in the serial command queue SQ, the garbage collection type determiner 1963A provides the garbage collection information Info$_{GC}$ queued in the serial command queue SQ to the garbage collection executor 1963B. On the other hand, when there is no garbage collection information Info$_{GC}$ queued in the serial command queue SQ, the garbage collection type determiner 1963A may provide the garbage collection information Info$_{GC}$ queued in the parallel command queue PQ to the garbage collection executor 1963B in order to perform the garbage collection operation during the idle period.

The garbage collection executor 1963B temporarily stores all valid pages of the victim block in the garbage collection buffer 144B according to the garbage collection information Info$_{GC}$ received from the garbage collection type determiner 1963A. The garbage collection executor 19633 copies all the valid pages stored in the garbage collection buffer 1443 to a destination block. The garbage collection executor 19638 may delete garbage collection information Info$_{GC}$, on which the garbage collection operation has been performed, from the parallel or serial command queue PQ or SQ.

FIG. 12 is a flowchart illustrating an operation process of the garbage collection manager in accordance with an embodiment.

Referring to FIG. 12, in step S1210, the garbage collection manager 1963 determines a type of garbage collection to be performed according to a trigger time point. For example, the trigger time point may depend on the host task operation.

When the host task operation is performed at the trigger time point in step S1220, the garbage collection manager 1963 determines whether there is garbage collection information Info$_{GC}$ queued in the parallel command queue PQ, in order to perform a garbage collection operation in parallel with the host task operation in step S1230.

When there is the garbage collection information Info$_{GC}$ queued in the parallel command queue PQ ("YES" in step S1230), the garbage collection manager 1963 performs the garbage collection operation according to the garbage collection information Info$_{GC}$ queued in the parallel command queue PQ.

On the other hand, when there is no garbage collection information Info$_{GC}$ queued in the parallel command queue PQ ("NO" in step S1230), since it is not possible to perform the garbage collection operation in parallel with the host task operation, the garbage collection manager 1963 performs the garbage collection operation according to garbage collection information Info$_{GC}$ queued in the serial command queue SQ, in order to perform the garbage collection operation in an idle period after the currently-being-performed host task operation is completed.

On the other hand, during the idle period of no host task operation, the garbage collection type determiner 1963A determines whether there is garbage collection information Info$_{GC}$ queued in the serial command queue SQ (step S1260).

When there is the garbage collection information Info$_{GC}$ queued in the serial command queue SQ ("YES" in step S1260), the garbage collection manager 1963 performs the garbage collection operation according to the garbage collection information Info$_{GC}$ queued in the serial command queue SQ (step S1270).

On the other hand, when there is no garbage collection information Info$_{GC}$ queued in the serial command queue SQ ("NO" in step S1260), the garbage collection manager 1963 performs the garbage collection operation according to the garbage collection information Info$_{GC}$ queued in the parallel command queue PQ, in order to perform the garbage collection operation during the idle period (step S1240).

In the garbage collection execution methods performed in step S1240 and step S1270, the garbage collection manager 1963 temporarily stores all the valid pages of the victim block in the garbage collection buffer 144B according to the garbage collection information Info$_{GC}$. The garbage collection manager 1963 copies all the valid pages stored in the garbage collection buffer 144B to a destination block.

In step S1250, the garbage collection manager 1963 may delete garbage collection information Info$_{GC}$, on which the garbage collection operation has been performed, from the parallel or serial command queue PQ or SQ.

Although various embodiments have been illustrated and described, it will be apparent to those skilled in the art that various changes and modifications may be made without departing from the spirit and scope of the invention as defined in the following claims. The present invention encompasses all such changes and modifications that fall within the scope of the claims.

What is claimed is:

1. A memory system comprising:
   a memory device including a plurality of dies each including a plurality of memory blocks; and
   a controller including a memory and a garbage collection module configured to perform a garbage collection operation by transmitting data to the memory device through at least one of a plurality of data paths,
   wherein the garbage collection module determines whether the garbage collection operation is executable in parallel with a host task operation, depending on which of the plurality of dies includes a target block of the garbage collection operation,
   wherein the garbage collection module is configured to:
   determine whether one or more closed blocks exist in remaining dies excluding an n$^{th}$ die that includes an open block among the plurality of dies in order to determine whether the host task operation and the garbage collection operation are executable in parallel,
   determine that the host task operation and the garbage collection operation are executable in parallel when one or more closed blocks exist in the remaining dies, and
   determine that the host task operation and the garbage collection operation are executable in series when no closed block exists in the remaining dies.

2. The memory system of claim 1, wherein the garbage collection module comprises:
   a victim block manager configured to detect a victim block after determining whether the host task operation and the garbage collection operation are executable in parallel, and store garbage collection information and status information corresponding to the victim block in the memory, the garbage collection information including address information of the victim block and the status information indicating whether the garbage collection operation on the victim block is executable in parallel with the host task operation;

a queue manager configured to sequentially queue the garbage collection information to a parallel command queue or a serial command queue according to the status information; and a garbage collection manager configured to determine a garbage collection type according to a trigger time point, and perform the garbage collection operation in parallel or in series with the host task operation according to the garbage collection information queued in the parallel or serial command queue corresponding to the garbage collection type.

3. The memory system of claim 1, wherein the victim block manager selects the victim block from the plurality of closed blocks in the remaining dies when it is determined that the host task operation and the garbage collection operation are executable in parallel, and selects the victim block from a plurality of closed blocks in the $n^{th}$ die when it is determined that the host task operation and the garbage collection operation are not executable in parallel.

4. The memory system of claim 3, wherein the victim block manager stores, in the memory, the garbage collection information on the selected victim block and the status information indicating whether the host task operation and the garbage collection operation are executable in parallel.

5. The memory system of claim 2, wherein the queue manager detects type information of the victim block by using the status information corresponding to the garbage collection information stored in the memory, classifies the garbage collection information into a parallel collection group or a serial garbage collection group according to the type information of the victim block, and sequentially queues the parallel collection group in a parallel garbage collection queue and the serial garbage collection group in a serial garbage collection queue.

6. The memory system of claim 2, wherein, in the parallel command queue, garbage collection information on the victim block, on which the garbage collection operation is to be performed in parallel with the host task operation, is queued.

7. The memory system of claim 2, wherein, in the serial command queue, garbage collection information on the victim block, on which the garbage collection operation is to be performed without the host task operation being performed, is queued.

8. The memory system of claim 2, wherein the trigger time point depends on the host task operation.

9. The memory system of claim 8, wherein, when the host task operation is performed at the trigger time point, the garbage collection manager determines whether the garbage collection information is queued in the parallel command queue, in order to perform the host task operation and the garbage collection operation in parallel.

10. The memory system of claim 9, wherein, when the garbage collection information is determined to be queued in the parallel command queue, the garbage collection manager performs garbage collection according to the garbage collection information queued in the parallel command queue, and wherein, when the garbage collection information is determined to not be queued in the parallel command queue, the garbage collection manager performs garbage collection according to the garbage collection information queued in the serial command queue for performing the garbage collection operation in an idle period.

11. The memory system of claim 8, wherein, when the garbage collection operation is performed at the trigger time point, the garbage collection manager determines whether the garbage collection information is queued in the serial command queue, in order to serially perform the host task operation and the garbage collection operation.

12. The memory system of claim 10, wherein, when the garbage collection information is determined to be queued in the serial command queue, the garbage collection manager performs the garbage collection operation according to the garbage collection information queued in the serial command queue, and wherein, when the garbage collection information is determined to not be queued in the serial command queue, the garbage collection manager performs the garbage collection operation according to the garbage collection information queued in the parallel command queue.

13. The memory system of claim 2, wherein the garbage collection manager temporarily stores all valid pages of the victim block in the memory according to the garbage collection information, and copies all the stored valid pages to a destination block.

14. The memory system of claim 13, wherein the garbage collection manager deletes the garbage collection information, of which the garbage collection operation has been performed on the victim block, from the parallel or serial command queue.

15. An operating method of a memory system comprising a memory device including a plurality of dies each including a plurality of memory blocks and a controller including a memory and configured to perform a host task operation and a garbage collection operation by transmitting data to the memory device through at least one of a plurality of data paths, the operating method comprising:

determining whether the host task operation and the garbage collection operation are executable in parallel;

detecting a victim block;

storing garbage collection information and status information corresponding to the victim block in the memory, the garbage collection information including address information of the victim block and the status information indicating whether the garbage collection operation on the victim block is executable in parallel with the host task operation;

sequentially queuing the garbage collection information to a parallel command queue or a serial command queue according to the status information;

determining a garbage collection type according to a trigger time point; and performing the garbage collection operation in parallel according to the garbage collection information queued in the parallel or serial command queue corresponding to the garbage collection type, wherein the step of determining whether the host task operation and the garbage collection operation are executable in parallel comprises:

determining whether one or more closed blocks exist in remaining dies excluding an $n^{th}$ die that includes an open block among the plurality of dies;

determining that the host task operation and the garbage collection operation are executable in parallel when one or more closed blocks exist in the remaining dies; and determining that the host task operation and the garbage collection operation are executable in series when no closed block exists in the remaining dies.

16. The operating method of claim 15, wherein, when it is determined that the host task operation and the garbage collection operation are executable in parallel, the victim block is selected from the plurality of closed blocks in the remaining dies.

17. The operating method of claim 15, wherein, when it is determined that the host task operation and the garbage collection operation are not executable in parallel, the victim block is selected from a plurality of closed blocks in the $n^{th}$ die.

18. The operating method of claim 15, wherein the garbage collection information on the selected victim block and the status information indicating whether the host task operation and the garbage collection operation are executable in parallel are stored in the memory.

19. The operating method of claim 15, wherein the step of sequentially queuing the garbage collection information comprises:
  detecting type information of the victim block by using the status information corresponding to the garbage collection information stored in the memory,
  classifying the garbage collection information into a parallel garbage collection group or a serial garbage collection group according to the type information of the victim block; and
  sequentially queuing the classified garbage collection information to a corresponding parallel collection queue or a serial garbage collection queue.

20. The operating method of claim 15, wherein, in the parallel command queue, garbage collection information on the victim block, on which the garbage collection operation is to be performed in parallel with the host task operation, is queued.

21. The operating method of claim 15, wherein, in the serial command queue, garbage collection information on the victim block, on which the garbage collection operation is to be performed without the host task operation being performed, is queued.

22. The operating method of claim 15, wherein the trigger time point depends on the host task operation.

23. The memory system of claim 22, wherein the performing of the garbage collection operation includes:
  determining, when the host task operation is performed at the trigger time point, whether the garbage collection information is queued in the parallel command queue in order to perform the host task operation and the garbage collection operation in parallel; and
  performing the garbage collection operation according to the garbage collection information.

24. The operating method of claim 23,
  wherein, when the garbage collection information is queued in the parallel command queue, garbage collection is performed according to the garbage collection information queued in the parallel command queue, and
  wherein, when the garbage collection information is queued to in the serial command queue, garbage collection is performed according to the garbage collection information queued in the serial command queue for performing the garbage collection operation in an idle period.

25. The operating method of claim 22, wherein, when the garbage collection operation is performed at the trigger time point, whether the garbage collection information is queued in the serial command queue is determined in order to serially perform the host task operation and the garbage collection operation; and
  performing the garbage collection operation.

26. The operating method of claim 25,
  wherein, when the garbage collection information is queued in the serial command queue, garbage collection is performed according to the garbage collection information queued in the serial command queue, and
  wherein, when the garbage collection information is queued in the parallel command queue, garbage collection is performed according to the garbage collection information queued in the parallel command queue.

27. The operating method of claim 15, wherein the step of performing the garbage collection operation according to the garbage collection information comprises:
  temporarily storing all valid pages of the victim block in the memory according to the garbage collection information and copying all the stored valid pages to a destination block; and
  deleting the garbage collection information, of which the garbage collection operation has been performed on the victim block, from the parallel or serial command queue.

28. A memory system comprising:
  a memory device including dies operably coupled to respective channels and each having memory blocks; and
  a controller configured to control, through the channels, the memory device to perform a device task operation, the device task operation including a garbage collection operation and a task operation corresponding to a host command,
  wherein the controller is further configured to determine whether the garbage collection operation is executable in parallel with the task operation by:
  determining whether one or more closed blocks exist in remaining dies excluding an $n^{th}$ die that includes an open block among the plurality of dies in order to determine whether the host task operation and the garbage collection operation are executable in parallel,
  determining that the host task operation and the garbage collection operation are executable in parallel when one or more closed blocks exist in the remaining dies, and
  determining that the host task operation and the garbage collection operation are executable in series when no closed block exists in the remaining dies.

* * * * *